United States Patent [19]

Harvey

[11] Patent Number: 4,703,895
[45] Date of Patent: Nov. 3, 1987

[54] GROUND-ENGAGING TRAVELLING STRUCTURE

[76] Inventor: Vernon B. W. Harvey, Tanglewood, Stour Close, Little Canford, Wimborne, Dorset, United Kingdom, BH21 7LU

[21] Appl. No.: 713,790

[22] Filed: Mar. 20, 1985

[30] Foreign Application Priority Data

Mar. 20, 1984 [GB] United Kingdom ............... 8407199

[51] Int. Cl.⁴ .............................................. B05B 3/18
[52] U.S. Cl. ..................................... 239/731; 239/741
[58] Field of Search ................... 239/710, 715, 7.19, 239/7.20, 177.1, 178, 728, 730, 731, 741; 137/899; 280/404, 127, 128, 6.1, 6 H; 52/116

[56] References Cited

U.S. PATENT DOCUMENTS

| | | | |
|---|---|---|---|
| 2,796,717 | 6/1957 | Orelind et al. ...................... | 280/6.1 |
| 2,843,424 | 7/1958 | Bruce ................................. | 239/719 |
| 3,605,928 | 9/1971 | Loesch ............................... | 239/720 |
| 3,620,542 | 11/1971 | Hovorka ............................ | 280/6.1 |
| 3,631,884 | 1/1972 | Von Linsowe ..................... | 239/719 |
| 3,701,358 | 10/1972 | Von Linsowe ..................... | 239/719 |
| 3,780,947 | 12/1973 | Ririe .................................. | 239/720 |
| 3,970,009 | 7/1976 | Schultz .............................. | 280/6.1 |
| 4,279,319 | 7/1981 | Joyce, Jr. ........................... | 280/6.1 |
| 4,368,848 | 1/1983 | Emrich ............................... | 239/720 |
| 4,434,936 | 3/1984 | Chapman et al. ................... | 239/720 |

Primary Examiner—Andres Kashnikow
Assistant Examiner—Patrick N. Burkhart
Attorney, Agent, or Firm—Gifford, Groh, VanOphem, Sheridan, Sprinkle and Dolgorukov

[57] ABSTRACT

A ground-engaging travelling structure supporting a member which is pivotally mounted on the structure for swinging movement about a fore-and-aft axis of the structure and including a device to maintain the member in a substantially constant position with respect to the structure and the ground. The member may be an upright pipe supplying an irrigation boom with water and the device may be actuated by a pendulum and so be responsive to deviation of the supply pipe from the upright position and operable to operate a fluid actuator to restore the supply pipe to its upright position. The actuator may be connected in a circuit including pressure-relief valves operable to limit the end loading which is permitted to be exerted on the boom by the supply pipe.

4 Claims, 5 Drawing Figures

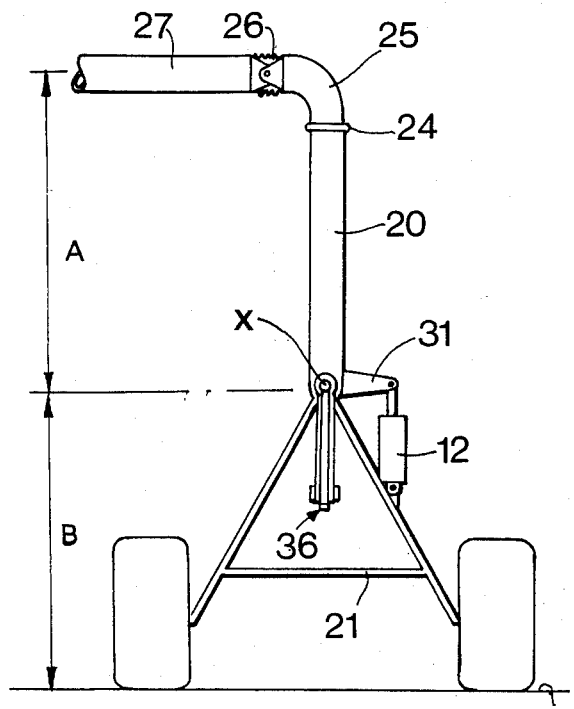
FIG.1
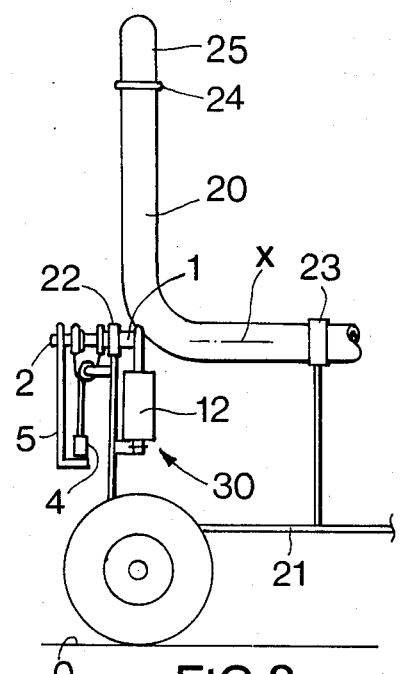
FIG.2
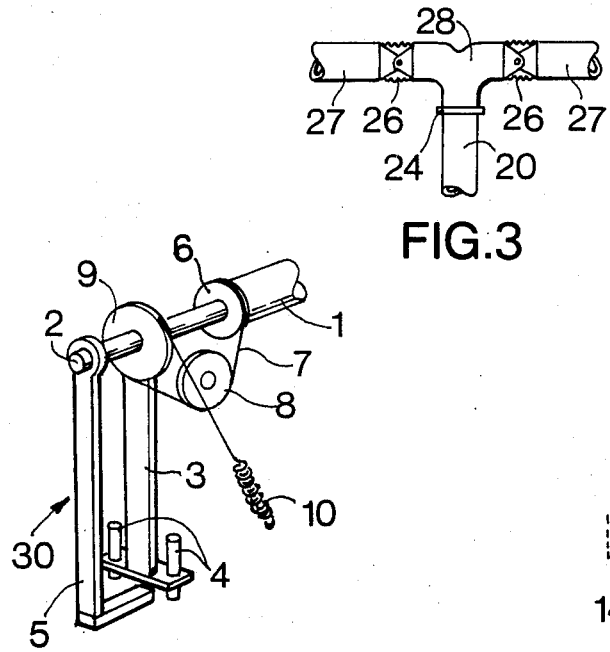
FIG.3
FIG.4
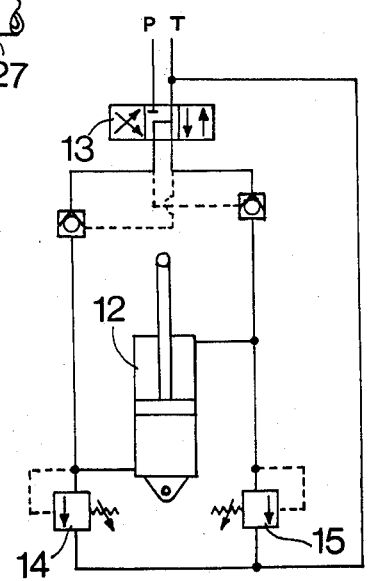
FIG.5

GROUND-ENGAGING TRAVELLING STRUCTURE

The invention relates to a ground-engaging travelling structure. An object of the invention is to maintain a member carried thereon in a substantially constant position above the ground despite sideways tipping of the structure due to uneven terrain over which the structure is travelling.

FIELD OF THE INVENTION

The invention is particularly, but not exclusively, concerned with a ground-engaging travelling structure having an upright pipe supporting and supplying a irrigation boom which is to be maintained in a substantially constant position above the ground but could be applied to any other ground-engaging travelling structure having a member thereon which is to be maintained in a substantially constant position above the ground despite sideways tipping of the vehicle.

Another object of the invention is to enable loading on the member or exerted by the member on the structure due to sideways tipping of the structure to be controlled below predetermined limits.

SUMMARY OF THE INVENTION

According to the invention, a structure, having ground-engaging means by which the structure is arranged to travel on the ground in a direction along a fore-and-aft axis of the structure and supporting a member which is pivotally mounted on the structure for swinging movement about said fore-and-aft axis, has compensating means whereby the member is adjustable automatically about said axis relative to the structure, when the latter is tipped sideways as a result of travelling on uneven terrain, thereby to maintain the member in a substantially constant position with respect to the structure and the ground.

The compensating means may comprise an arm extending rigidly from said member and arranged to pivot with said member about said fore-and-aft axis; a fluid-actuator mounted on said structure and having a plunger connected to the arm at a position thereon spaced from said fore-and-aft axis, and a pendulum-actuated device arranged to actuate a valve means to control the flow and exhaust of working fluid to and from the actuator thereby to move said arm to maintain the member in a substantially constant position despite deviation of the structure from its upright position as detected by said pendulum-actuated device.

The working fluid circuitry of the actuator may include at each end thereof a separately-adjustable pressure-relief valve which will open at a pre-set limiting pressure, whereby the maximum load exerted on the member or by the member on the structure will not exceed a value determined by the pre-set limiting pressure. For example, where said member is an upright pipe supporting and supplying an irrigation boom, the end loading exerted by the upright pipe on the boom or the end loading exerted by the boom on the upright pipe will be maintained below a limiting value in accordance with the individual setting of one or other of said pressure-relief valves.

BRIEF DESCRIPTION OF THE DRAWINGS

By way of example, a ground-engaging travelling structure supporting an irrigation boom in accordance with the invention is now described with reference to the accompanying drawings, in which:

FIG. 1 is an end view of the structure looking in the fore-and-aft direction and showing an irrigation boom extending from one side of the fore-and-aft axis of the structure;

FIG. 2 is a side view of the structure shown in FIG. 1;

FIG. 3 shows a modification of part of FIG. 1 illustrating an irrigation boom extending from each side of the fore-and-aft axis of the structure;

FIG. 4 is a perspective view of part of the structure shown in FIGS. 1 and 2 and illustrates the aforesaid pendulum-actuated device, and FIG. 5 shows the fluid circuity of the aforesaid fluid actuator, which is also shown in FIGS. 1 and 2.

DESCRIPTION OF THE PREFERRED EMBODIMENT

Referring first to FIGS. 1 and 2, the ground-engaging travelling structure is a wheeled chassis 21 supporting an upright limb of an L-shaped supply pipe 20 which is to be connected to an inlet hose which may be connected directly to a fixed hydrant or indirectly via a hose wound on a drum mounted on the chassis or to another source of water or other liquid, e.g., in a tank carried on the chassis. The upright limb of the pipe 20 supports at its upper end an elbow 25 rotatable on bearing 24 about the axis of the pipe 20. The elbow 25 is connected via a flexible joint 26 to a substantially horizontal boom 27 which is supported by the chassis 21 and may be supported additionally by at least one further wheeled chassis. The joint 26 permits flexing between the boom 27 and the elbow 25 about a transverse axis substantially parallel to the ground. The pipe 20 has its other limb arranged substantially parallel to the ground in bearings 22 and 23 for swivelling about an axis X substantially parallel to the ground and extending in the fore-and-aft direction of the chassis 21. The structure according to the invention includes a device 30, to be described in greater detail hereinafter, whereby the upright limb of the pipe 20 is maintained substantially vertical despite sideways tipping of the structure 21 due to uneven terrain and so the pipe 20 and the chassis 21 can be regarded as a linkage having arms of length A and B pivoted about axis X, where A is the distance of the horizontal axis of the boom 27 from the axis X and B is the distance of the axis X above the ground-line O. The maintenance of the upright limb 20 in a substantially vertical position and of the flexible connection 26 enables the boom 27 to be maintained in a substantially constant position despite sideways tipping of the chassis 21 due to the terrain on which the chassis 21 is travelling.

FIG. 3 shows an alternative construction in which there is a boom 27 extending from each side of the upright limb of the supply pipe 20 instead of one side only, as in FIGS. 1 and 2. In FIG. 3, the two booms are supplied through a T-connector 28 which is mounted to swivel on bearings 24 about the axis of the upright limb of the pipe 20, similarly to the elbow 25 in FIGS. 1 and 2. The branches of the T-connector are connected to the respective booms 27 by respective flexible connectors 26 each similar to the flexible connector 26 in FIG. 1.

The device 30 shown in FIGS. 1 and 2 comprises a shaft 2 which is an integral extension of a shaft 1 by which the pipe 20 is supported in bearing 22. The shafts 1 and 2 are rotatable with the horizontal limb of the pipe 20 about the axis of pivoting X. The shaft 2 carries a first pulley 6 (see FIG. 4) which is rotatable with the shaft 2 and a freely rotatable pendulum 5. The shaft 2 also carries a second freely rotatable, pulley 9 which carries an arm 3 which depends from the shaft 2 and is parallel with the pendulum 5 when the chassis 21 is on level ground, that is it is not tipped sideways. The pulleys 6 and 9 are engaged by a cable 7 which also passes around an idler pulley 8 and is anchored at one end to the pulley 6 and at the other end to the chassis 21 via a spring 10. Alternatively the cable may be fixed at both ends to one or other of the pulleys 6 and 9 and passed around those pulleys and a pair of idler pulleys to achieve the same result.

The device 30, as just described, operates in the following way when the chassis 21 tips sideways in one direction or the other: Chassis 21 turns about the axis X relative to the pipe 20 and thus the shaft 2 turns about the axis X relatively to the chassis 21; this has the effect of turning the pulley 6 with respect to the pendulum 5 which remains vertical; the turning of the pulley 6 turns the pulley 9 via the cable 7 and so the arm 3 is swung in the appropriate direction. The ratio of the diameters of the first and second pulleys 6 and 9 is equal to the ratio of the dimensions B:A to give the correct swing of the arm 3 in response to the angle of tipping of the chassis 21. The lower end of the arm 3 carries a pair of laterally-spaced switches 4 between which a foot on the pendulum is located. When the arm 3 is swung by a sufficient angle to one side or the other of the pendulum 5, one or other of the switches 4 is actuated.

Turning now to FIG. 5, the actuation of one or other of the switches 4 effects a change over of a reversing valve 13 which is connected in a fluid circuit to move the piston of an actuator 12. This is mounted on the chassis 21 and the piston is connected to an arm 31 extending rigidly from the pipe 20 and rotatable with the pipe 20 about the axis X.

When the arm 3 swings to one side or the other relative to the pendulum 5 as a result of sideways tipping of the chassis 21 an appropriate restoring moment is applied by the actuator 12 via the arm 31 on the pipe 20 until the arm 3 again becomes parallel with the pendulum 5 thereby to cancel the appropriate switch 4. In this way the pipe 20 is maintained substantially upright despite sideways tipping of the chassis 21 due to uneven terrain and so the boom 27 is maintained in a substantially constant position above the ground.

The fluid circuitry of the actuator 12 includes a pair of separately adjustable relief valves 14, 15 each limiting a maximum permissible pressure exerted on or by the piston of the actuator 12 as it moves in one direction or the other. The valves 14, 15 therefore respectively limit the forces transmitted by or to the pipe 20 via the arm 31 and therefore the end loading between the boom 27 and the pipe 20. As the valves 14 and 15 are adjustable individually, the maximum end loading permissible on or by the boom 27 can be adjusted separately with regard to sideways tipping of the chassis 21 in each direction.

The invention therefore enables a boom to be supported at an end thereof in a substantially constant position above the ground and for the permissible end loading of the boom to the controlled despite an irregular terrain which will result in sideways tipping of the chassis 21. Therefore with this invention, there is no need for the chassis to have an especially prepared level track on which to travel.

Although the chassis 21 illustrated has ground-engaging wheels, the chassis may run on a pair of endless tracks or even be pulled along on skids.

Although the invention has been applied in this example to a chassis carrying an irrigation boom, it may have other applications such as travelling drilling rigs, working platforms, column or post erecting machines or fire-fighting platforms.

What I claim as my invention and desire to secure by Letters Patent of the United States is:

1. A crop irrigator comprising a movable structure; ground-engaging means by which said structure is arranged to travel on the ground in a direction parallel to a fore-and-aft axis positioned at a first distance above said ground; a normally upright water supply pipe pivotally mounted on said structure for swinging movement about said fore-and-aft axis, said pipe having an upper end at a second distance above said fore-and-aft axis; a first arm extending rigidly from said pipe and arranged to pivot with said pipe about said fore-and-aft axis; a fluid actuator mounted on said structure; a plunger in said actuator connected to said first arm at a position thereon spaced from said fore-and-aft axis; valve means to control the flow and exhaust of working fluid to and from said actuator; a shaft extending from said pipe and arranged to turn therewith about said fore-and-aft axis; a first pulley mounted on said shaft for rotation therewith; a second pulley freely rotatable on said shaft; an elongate driving element passing around said first and second pulleys, whereby said second pulley is driven by said first pulley, said first and second pulleys having diameters substantially equal to the ratio of said first and second distances; a second arm mounted on said second pulley and arranged to be swung thereby about said fore-and-aft axis on turning said second pulley in either direction on deviation of said pipe about said fore-and-aft axis from its normal upright position; switch means mounted on said second arm and operable to actuate said valve means to reverse the direction of movement of said actuator, and a pendulum mounted to swing freely on said shaft about said fore-and-aft axis and engaged by said switch means, when said second arm has been swung about said fore-and-aft axis on deviation of said pipe from its normal upright position as a result of said structure travelling on uneven terrain, thereby to actuate said valve means and thus to reverse said actuator and thereby to maintain the upper end of said pipe in the position corresponding to the normal upright position of said pipe.

2. A structure as claimed in claim 1 in which said actuator is connected to fluid circuitry, said fluid circuitry including a pair of pressure relief valves, each in communication with a respective end of said actuator plunger and each separately adjustable to open at a pre-set limiting pressure.

3. A structure as claimed in claim 2 combined with an irrigation boom supported by and connected to the upper end of said upright pipe, whereby the end loading at said boom will be maintained below a limiting value in accordance with the individual setting of one of said pressure relief valves.

4. A structure as claimed in claim 1 in which said elongate driving element is a cable.

* * * * *